United States Patent
Schneider

(10) Patent No.: US 8,265,272 B2
(45) Date of Patent: Sep. 11, 2012

(54) METHOD AND AN APPARATUS TO GENERATE PSEUDO RANDOM BITS FOR A CRYPTOGRAPHIC KEY

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 965 days.

(21) Appl. No.: 11/897,414

(22) Filed: Aug. 29, 2007

(65) Prior Publication Data

US 2009/0060180 A1    Mar. 5, 2009

(51) Int. Cl.
*H04L 29/06* (2006.01)
(52) U.S. Cl. ............................. 380/46; 380/47
(58) Field of Classification Search .............. 380/46, 380/47
See application file for complete search history.

(56) References Cited

U.S. PATENT DOCUMENTS

| | | | |
|---|---|---|---|
| 4,157,454 A | 6/1979 | Becker | |
| 5,003,597 A | 3/1991 | Merkle | |
| 5,214,703 A | 5/1993 | Massey et al. | |
| 5,619,576 A | 4/1997 | Shaw | |
| 5,724,428 A | 3/1998 | Rivest | |
| 5,799,088 A | 8/1998 | Raike | |
| 6,061,449 A | 5/2000 | Candelore et al. | |
| 6,122,379 A | 9/2000 | Barbir | |
| 6,247,112 B1* | 6/2001 | Seki ........................ | 712/42 |
| 6,523,114 B1 | 2/2003 | Barton | |
| 6,560,338 B1 | 5/2003 | Rose et al. | |
| 6,999,588 B1 | 2/2006 | Oishi | |
| 7,103,181 B2 | 9/2006 | Ananth | |
| 7,263,540 B1 | 8/2007 | Kuehnel | |
| 7,328,228 B2 | 2/2008 | Klein et al. | |
| 7,795,899 B1 | 9/2010 | Grohoski et al. | |
| 7,925,009 B2 | 4/2011 | Schneider | |
| 7,945,049 B2 | 5/2011 | Schneider | |
| 7,962,540 B2 | 6/2011 | Michaels et al. | |
| 2001/0029608 A1 | 10/2001 | Nagashima et al. | |
| 2001/0033656 A1 | 10/2001 | Gligor et al. | |
| 2002/0054679 A1* | 5/2002 | Vesely ......................... | 380/46 |
| 2002/0124033 A1 | 9/2002 | Takahashi | |
| 2002/0136406 A1 | 9/2002 | Fitzhardinge et al. | |
| 2003/0048728 A1 | 3/2003 | Kuribayashi et al. | |
| 2003/0048899 A1* | 3/2003 | Spacey ......................... | 380/37 |
| 2003/0059040 A1* | 3/2003 | Rose et al. ................... | 380/1 |

(Continued)

OTHER PUBLICATIONS

McLaughlin, Apr. 6, 2007, "Random Number Generation for Cryptography," http://imps.mcmaster.ca/courses/SE-4CO3-07/wiki/mclaucwj/Random_Number_Generation_for_Cryptography.html, pp. 1-3.*

(Continued)

*Primary Examiner* — Farid Homayounmehr
*Assistant Examiner* — Lisa Lewis
(74) *Attorney, Agent, or Firm* — Lowenstein Sandler PC

(57) ABSTRACT

Some embodiments of a method and an apparatus to generate pseudo random bits for a cryptographic key have been presented. In one embodiment, a set of Blum-Blum-Shub (BBS) pseudo random number generators is executed substantially in parallel. Each of the BBS pseudo random number generators may generate a series of pseudo random bits. A subset of pseudo random bits is extracted from each of the series of pseudo random bits from each of the plurality of BBS pseudo random number generators. Subsets of the series of pseudo random bits from the BBS pseudo random number generators are combined to generate a cryptographic key.

20 Claims, 5 Drawing Sheets

U.S. PATENT DOCUMENTS

| | | | |
|---|---|---|---|
| 2003/0217268 A1* | 11/2003 | Gantman | 713/172 |
| 2004/0120518 A1 | 6/2004 | Macy et al. | |
| 2005/0097153 A1 | 5/2005 | Dirscherl et al. | |
| 2005/0131961 A1 | 6/2005 | Margolus | |
| 2005/0177727 A1 | 8/2005 | Moskowitz et al. | |
| 2006/0126843 A1 | 6/2006 | Brickell et al. | |
| 2007/0076890 A1 | 4/2007 | Muresan et al. | |
| 2007/0237327 A1 | 10/2007 | Taylor et al. | |
| 2008/0069342 A1 | 3/2008 | Relyea | |
| 2008/0109501 A1 | 5/2008 | Douguet et al. | |
| 2008/0130876 A1 | 6/2008 | Etienne et al. | |
| 2008/0292096 A1 | 11/2008 | Schneider | |
| 2008/0298583 A1 | 12/2008 | Ahmed | |
| 2008/0307024 A1 | 12/2008 | Michaels et al. | |
| 2009/0060179 A1 | 3/2009 | Schneider | |
| 2009/0060180 A1 | 3/2009 | Schneider | |
| 2009/0195370 A1 | 8/2009 | Huffman et al. | |
| 2009/0214024 A1 | 8/2009 | Schneider | |
| 2009/0220083 A1 | 9/2009 | Schneider | |
| 2009/0279690 A1 | 11/2009 | Michaels et al. | |
| 2009/0292752 A1 | 11/2009 | Schneider | |
| 2010/0135486 A1 | 6/2010 | Schneider | |

OTHER PUBLICATIONS

Secure Cryptoprocessor, from Wikipedia, the free encyclopedia. http//en.wikipedia.org/wiki/Secure_cryptoprocessor. Aug. 10, 2007. 3 pages.

Blum Blum Shub from Wikipedia, the free encyclopedia. http//en.wikipedia.org/wiki/Blum_Blum_Shub. Aug. 9, 2007. 2 pages.

Finite Field from Wikipedia, the free encyclopedia. http//en.wikipedia.org/wiki/Galois_field. Aug. 10, 2007. 5 pages.

Applied Cryptography, 2nd Edition, Chapter 17, pp. 417-418.

Barker, William C., "Recommendation for the Triple Data Encryption Algorithm (TDEA) Block Cipher", National Institute of Standards and Technology, Technology Administration U.S. Department of Commerce, Information Security, NIST Special Publication 800-67, Version 1.1, Revised May 19, 2008, 40 pages.

Bauer, Friedrich L., "8. Transposition Ciphers", Decrypted Secrets, 2nd edition, (2000), 16 pages.

Belal, Ahmed A., et al., "2D-Encryption Mode" Mar. 2001, 32 pages.

Bellare, M., et al., "A Conventional Authenticated-Encryption Mode" Submission to National Institute of Standards and Technology, Apr. 13, 2003, 14 page.

Bellare, M., et al., "The FFX Mode of Operation for Format-Preserving Encryption" Feb. 20, 2010, pages.

Black, John, et al., "A Suggestion for handling Arbitrary-Length Messages with the CBC MAC", Aug. 2001, 3 pages.

Brier, Eric, et al., "BPS: a Format-Preserving Encryption Proposal" 11 pages, Ingenico, France. Published at the following website Apr. 2010, http://csrc.nist.gov/groups/ST/toolkit/BCM/modes development.html.

Cohen, Bram, "AES-hash" May 2, 2001, 4 pages.

"Data Encryption Standard (DES)", U.S. Department of Commerce/National Institute of Standards and Technology, FIPS PUB 46-3, Reaffirmed Oct. 25, 1999, 26 pages.

Dworkin, Morris, "Recommendation for Block Cipher Modes of Operation—Galois/Counter Mode (GCM) and GMAC" National Institute of Standards and Technology, Technology Administration U.S. Department of Commerce, Information Security, NIST Special Publication 800-38D, Nov. 2007, 39 pages.

Dworkin, Morris, "Recommendation for Block Cipher Modes of Operation—Methods and Techniques" National Institute of Standards and Technology, Technology Administration U.S. Department of Commerce, Information Security, NIST Special Publication 800-38A, 2001, 66 pages.

Dworkin, Morris, "Recommendation for Block Cipher Modes of Operation—The CCM Mode for Authentication and Confidentiality" National Institute of Standards and Technology, Technology Administration U.S. Department of Commerce, Information Security, NIST Special Publication 800-38C, May 2004, updated 2007, 27 pages.

Dworkin, Morris, "Recommendation for Block Cipher Modes of Operation—The CMAC Mode for Authentication" National Institute of Standards and Technology, Technology Administration U.S. Department of Commerce, Information Security, NIST Special Publication 800-38B, May 2005, 25 pages.

Dworkin, Morris, "Recommendation for Block Cipher Modes of Operation—the XTS-AES Mode for Confidentiality on Storage Devices" National Institute of Standards and Technology, Technology Administration U.S. Department of Commerce, Information Security, NIST Special Publication 800-38E, Jan. 2010, 12 pages.

Fischer, Viktor, "Realization of the Round 2 AES Candidates Using Altera FPGA", (2000), pp. 1-15.

Gligor, Virgil D., et al., "Fast Encryption and Authentication: XCBC Encryption and EXCB Authentication Modes" Mar. 30, 2001 (Apr. 20, 2001, revision), 64 pages, retrieved from http://csrc.nist.gov/groups/ST/toolkit/Bcm/modes_development.html.

Gligor, Virgil D., et al., "On Message Integrity in Symmetric Encryption" Nov. 10, 2000, 41 pages. VDG Inc., Maryland.

Hastad, Johan, et al., "Key Feedback Mode: a Keystream Generator with Provable Security" Oct. 11, 2000, 23 pages, Stockholm, Sweden.

Hellstrom, Henrick, "Propagating Cipher Feedback mode" 2001, 4 pages.

Housely, Russ, et al., "Counter with CBC-MAC (CCM)—AES Mode of Operation" RSA Laboratories, Submission to National Institute of Standards and Technology, Jun. 3, 2002, 9 pages.

Iwata, Tetsu, et al., "OMAC: One-Key CBC MAC" Dec. 20, 2002, 32 pages.

Jaulmes, Antoine Joux, et al., "On the Security of Randomized CBC-MAC Beyond the Birthday Paradox Limit a New Construction" 2002, 15 pages, DCSSI Crypto Lab.

Jutla, Charanjit S., "Encryption Modes with Almost Free Message Integrity" IBM T.J. Watson Research Center, New York, 2001, 6 pages.

Jutla, Charanjit S., "Parallelizable Encryption Mode with Almost Free Message Integrity" IBM T.J. Watson Research Center, 2000, 23 pages.

Knudsen, Lars R., "Reports in Informatics—Block Chaining modes of operation" Oct. 2000, 16 pp., Report No. 207, Department of Informatics, University of Bergen, Bergen, Norway.

Kohno, Tadayoshi, et al., "The CWC Authenticated Encryption (Associated Data) Mode" May 27, 2003, 18 pages, Submission to National Institute of Standards and Technology.

Kurosawa, Kaoru, et al., "TMAC: Two-Key CBC MAC" Jun. 21, 2002, 18 pages.

Lipmaa, Helger, et al., "Comments to NIST concerning AES Modes of Operations:" CTR-Mode Encryption 2000, 4 pages.

Mattsson, Ulf T., "Format-Controlling Encryption using Datatype-Preserving Encryption" Jun. 30, 2009, 46 pages, Protegrity Corporation.

McGrew, David A., et al., The Galois/Counter Mode of Operation (GCM) Submission to National Institute of Standards and Technology, May 31, 2005, 44 pages.

Rogaway, Phillip, "PMAC—Proposal to NIST for a parallelizable message authentication code" Apr. 1, 2001, 27 pages.

Rogaway, Phillip, et al., "OCB: A Block-Cipher mode of operation for Efficient Authenticated Encryption" Aug. 3, 2001, 36 pages.

Rogaway, Phillip, et al., "The SIV Mode of Operation for Deterministic Authenticated-Encryption (Key Wrap) and Misuse-Resistant Nonce-Based Authenticated-Encryption" Aug. 20, 2007, 3 pages, retrieved from http://csrc.nist.gov/groups/ST/toolkit/BCM/modes_development.html.

RSA, "What is Cipher Block Chaining Mode?" Mar. 3, 2007 from Internet Archive WayBack machine. http://web.archive.org/web/20070303121357/http://www.rsa.com/rsalabs/node.asp?id=2171.

Schroeppel, Richard C., et al., "Cipher-State (CS) Mode of Operation for AES" Sandia National Laboratories, Submission to National Institute of Standards and Technology, May 7, 2004, 8 pages.

Schneier, "Applied Cryptography", John Wiley and Sons, 2nd Edition, (1996), p. 319.

"Transposition cipher", Wikipedia, the free encyclopedia, http://en.wikipedia.org/wiki/Transposition_cipher, accessed May 8, 2007, 8 pages.

Wolfram Math World, Primitive Polynomials, http://mathworld.wolfram.com/primitivepolynomial.html, pp. 1-2, Feb. 9, 2006 from Internet Archive WayBack Machine.
Red Hat Office Action for 11/807,261 (P150) mailed Jul. 19, 2010.
Red Hat Notice of Allowance for U.S. Appl. No. 11/807,261 mailed Dec. 14, 2010.
Red Hat Office Action for U.S. Appl. No. 11/897,411 mailed Sep. 2, 2010.
Red Hat Office Action for U.S. Appl. No. 12/072,069 mailed Sep. 2, 2010.
Red Hat Office Action for U.S. Appl. No. 12/074,012 mailed Sep. 3, 2010.
Red Hat Office Action for U.S. Appl. No. 12/325,228 mailed Sep. 3, 2010.
Red Hat Office Action for U.S. Appl. No. 12/154,465 mailed Sep. 20, 2010.
U.S. Appl. No. 11/897,411, Final Office Action dated Jan. 5, 2011.
U.S. Appl. No. 12/072,069, Final Office Action dated Jan. 5, 2011.
U.S. Appl. No. 12/074,012, Notice of Allowance dated Jan. 11, 2011.
U.S. Appl. No. 12/325,228, Final Office Action dated Feb. 4, 2011.
U.S. Appl. No. 12/154,465, Final Office Action dated Jan. 7, 2011.
"Data Encryption Standard (DES)", FIPS PUB 46-2, Dec. 30, 1993, 16 pages, http://www.itl.nist.gov/fipspubs/fip46-2.htm.
Mirza, Fauzan, "Block Ciphers and Cryptanalysis" Mar. 1998, pp. 1-27.
Schneier, "Applied Cryptography" 1996, John Wiley and Sons, $2^{nd}$ Edition, p. 237.
Rose, Greg, "A Stream Cipher Based on Linear Feedback over $GF(2^8)$", Springer-Verlag Berlin Heidelberg, C. Boyd and E. Dawson: ACISP '98, LNCSI1438, (1998), pp. 135-145.

Shannon, C.E., "Communication Theory of Secrecy Systems" Bell System Technical Journal, vol. 28, (4) 1949, pp. 656-715.
Tan, Chih Jeng K., "The PLFG parallel pseudorandom No. generator", Future Generation computer Systems vol. 18, Issue 5, (Feb. 2002), pp. 693-698.
Red Hat Notice of Allowance for U.S. Appl. No. 11/807,261, Mailed Feb. 28, 2011.
Red Hat Office Action for U.S. Appl. No. 12/154,465, mailed Dec. 28, 2011.
Red Hat Office Action for U.S. Appl. No. 11/897,411, mailed Dec. 21, 2011.
Red Hat Office Action for U.S. Appl. No. 11/897,411, mailed Aug. 26, 2011.
Red Hat Office Action for U.S. Appl. No. 12/072,069, mailed Oct. 3, 2011.
Red Hat Office Action for U.S. Appl. No. 12/072,069, mailed Apr. 29, 2011.
Red Hat Office Action for U.S. Appl. No. 12/072,069, mailed Feb. 22, 2012.
Red Hat Notice of Allowance for U.S. Appl. No. 12/074,012 Mailed Jan. 11, 2011.
Red Hat Office Action for U.S. Appl. No. 12/125,833, mailed Dec. 9, 2011.
Red Hat Office Action for U.S. Appl. No. 12/154,465, mailed Aug. 19, 2011.
Red Hat Office Action for U.S. Appl. No. 12/325,228, mailed Oct. 14, 2011.

* cited by examiner

METHOD AND AN APPARATUS TO GENERATE PSEUDO RANDOM BITS FOR A CRYPTOGRAPHIC KEY

TECHNICAL FIELD

Embodiments of the present invention relate to generating cryptographic keys, and more specifically to generating pseudo random numbers.

BACKGROUND

In cryptography, pseudo random number generators are typically employed to generate some pseudo random numbers for creating a cryptographic key. A well known pseudo random number generator that generates highly randomized numbers, which are strong in a cryptographic sense, is a Blum-Blum-Shub (BBS) pseudo random number generator. The BBS pseudo random number generator uses two large prime numbers, p and q, which are congruent to three, mod four. Their product, n=p*q, is called a Blum integer. An arbitrary integer X larger than both p and q, and relatively prime to n, is chosen. The BBS pseudo random number generator squares X, takes its remainder modulo n. This results in a seed, $X_0$. To generate bits, the BBS pseudo random number generator takes the most recent $X_i$ and squares it, then takes its remainder modulo n. The entire result is $X_{i+1}$, and the low order floor(lg(floor(lg(n)))) bits of $X_{i+1}$, are the output of one cycle (or iteration) of the BBS pseudo random number generator. The floor function returns the largest integer less than or equal to its argument, and the lg function is the logarithm of its argument in base 2. For example, if n is 21, which is the smallest Blum integer, the BBS pseudo random number generator may generate 2 bits every cycle.

The outputs of the BBS pseudo random number generator are pseudo random bits or pseudo random numbers because they are generated from the same set of initial values, but nevertheless, they approximate the behavior of true random numbers. In other words, the pseudo random numbers are dependent on each other, and thus, exposing too many of a set of pseudo random numbers from a BBS pseudo random number generator may allow someone to crack the code.

The security of the BBS pseudo random number generator rests on the size of n. A larger n generally implies a more secure stream in a cryptographic sense. Note that increasing the number of bits generated at each cycle by 1 may require doubling the size of n. Furthermore, n also influences the period length of the output. One of the properties of n is that every quadratic residue modulo n has four square roots, one of which is also a quadratic residue. A quadratic residue is the residue of a perfect square. For example, 47 is a quadratic residue module 209. Thus, every X in the sequence of pseudo random number is a quadratic residue, and no more than ¼ of the values less than n can be quadratic residues. Thus, there are no more than n/4 distinct states for the BBS pseudo random number generator, so the maximum period is floor(n/4). The bit stream may start repeating itself after n/4 cycles because there are only n/4 distinct states for the BBS pseudo random number generator.

BRIEF DESCRIPTION OF THE DRAWINGS

The present invention is illustrated by way of example, and not by way of limitation, in the figures of the accompanying drawings and in which.

DETAILED DESCRIPTION

Figure 1:
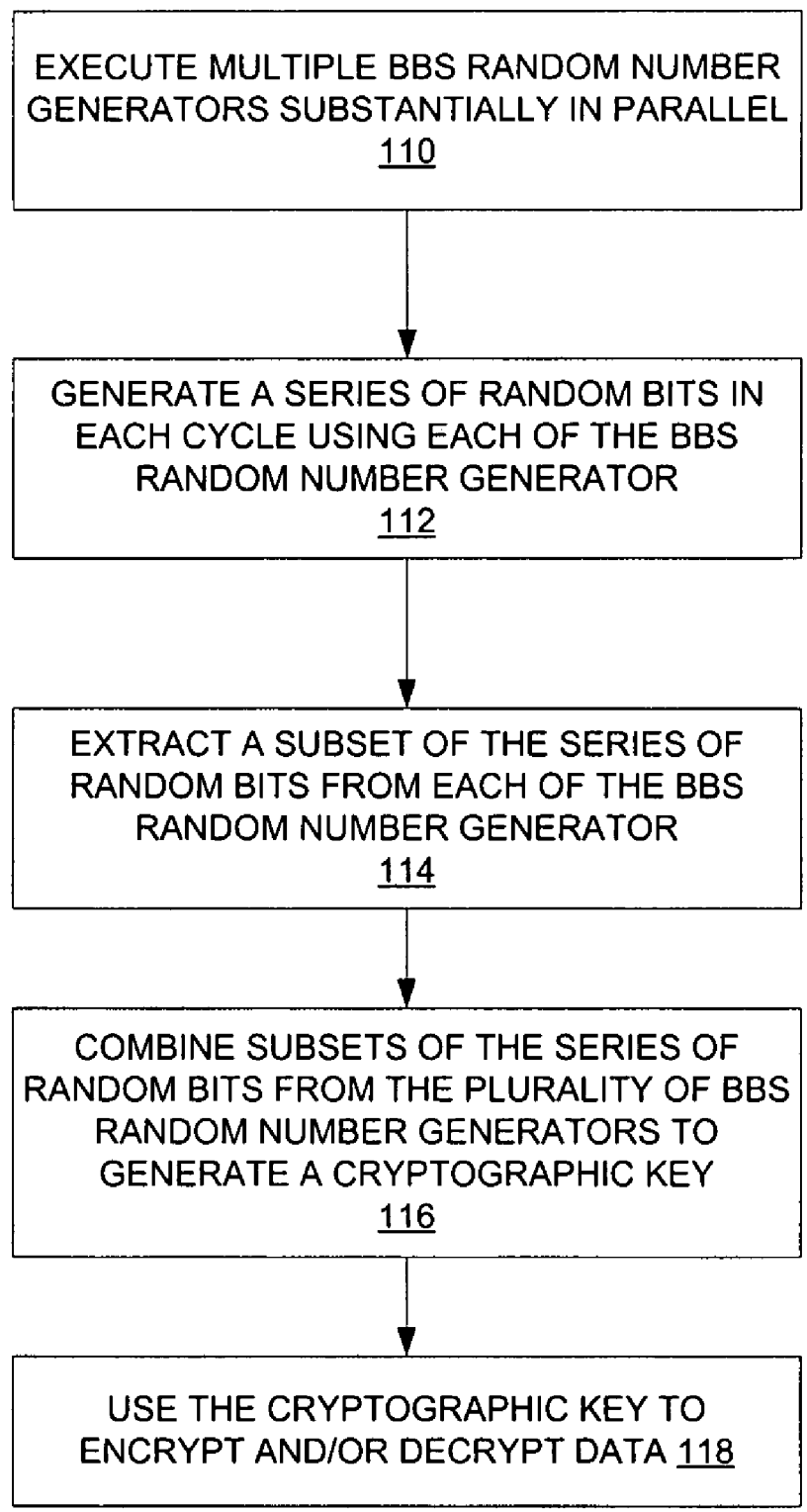
FIG. 1 illustrates a flow diagram of one embodiment of a process to generate pseudo random bits for a cryptographic key.

Described herein are some embodiments of a method and an apparatus to generate pseudo random bits for a cryptographic key. In some embodiments, a set of Blum-Blum-Shub (BBS) pseudo random number generators is executed substantially in parallel. Each of the BBS pseudo random number generators may generate a series of pseudo random bits. A subset of pseudo random bits is extracted from each of the series of pseudo random bits from each of the BBS pseudo random number generators. Subsets of the series of pseudo random bits from the BBS pseudo random number generators are combined to generate a cryptographic key. Some practical applications of the cryptographic key includes encryption and/or decryption of data, signing of electronic communication, etc. More details of some embodiments of the generation of the pseudo random bits for the cryptographic key are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a flow diagram of one embodiment of a process to generate pseudo random bits for a cryptographic key. The process may be performed by processing logic that may comprise hardware (e.g., circuitry, dedicated logic, programmable logic, microcode, etc.), software (such as instructions run on a processing device), firmware, or a combination thereof. For example, the parallel pseudo random number generator 210 and the cryptographic key generator 220 in FIG. 2 may perform at least part of the process in some embodiments.

Referring to FIG. 1, processing logic executes multiple BBS pseudo random number generators substantially in parallel (processing block 110). For example, processing logic may execute sixteen BBS pseudo random number generators in parallel in one embodiment. Each of the BBS pseudo random number generators generates a series of pseudo random bits in each cycle (a.k.a. iteration) (processing block 112). For example, a 64-bit BBS pseudo random number generator may generate 64 pseudo random bits in each cycle. These bits are referred to as pseudo random bits because these bits approximate the behavior or property of true random numbers. However, these bits are not truly random because these bits are derived from a set of initial values as discussed above. Then processing logic extracts a subset of the series of pseudo random bits from each of the BBS pseudo random number generators (processing block 114). In some embodiments, processing logic extracts the low order bits from each series (e.g., the three low order bits in the series of pseudo random bits). Next, processing logic combines the subsets of the series of pseudo random bits from the BBS pseudo random number generators to generate a cryptographic key (processing block 116). There are various ways to combine the subsets of pseudo random bits. For example, the subsets may be combined by applying exclusive-or (XOR) to the subsets. Alternatively, a linear combination operation may be performed on the subsets to combine them. One example of a linear combination operation is discussed in details below. Finally, processing logic uses the cryptographic key generated to encrypt and/or decrypt data (processing block 118). In some embodiments, processing logic may use the cryptographic key to sign electronic communication (e.g., electronic mail, instant messages, etc.).

As discussed above, each of the BBS pseudo random number generators multiplies two prime integers, p and q, to produce a Blum integer, n. The security of the pseudo random bits generated by the BBS pseudo random number generator depends on the size of n. A larger n may produce a more secure stream of pseudo random bits. Further, increasing the number of bits generated at each cycle by one requires doubling the size of the Blum integer. The Blum integer also influences the period length of the output of the BBS pseudo random number generator. The bit stream may start repeating itself after n/4 cycles because there are only n/4 distinct states for the generator. However, the larger n is, the longer it takes the BBS pseudo random number generator to run. By executing multiple BBS pseudo random number generators substantially in parallel, each using a smaller n, the time it takes to generate a predetermined number of pseudo random bits may be reduced without materially compromising security or strength of the pseudo random bits generated.

Figure 2:
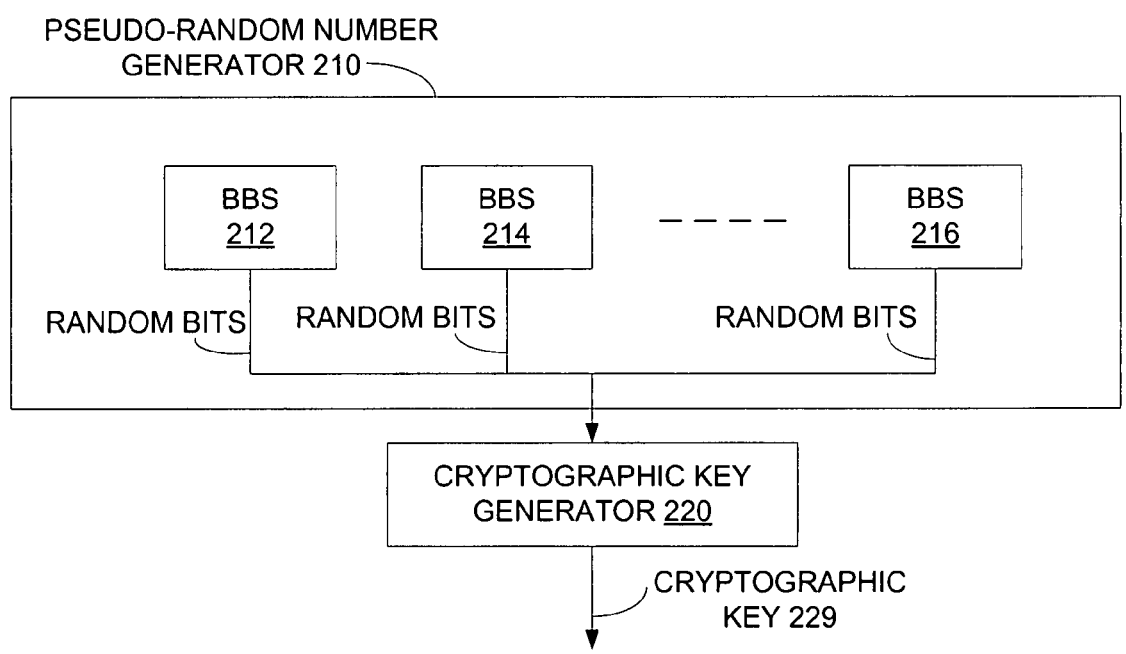
FIG. 2 illustrates a functional block diagram of one embodiment of a parallel pseudo random number generator and a cryptographic key generator.

FIG. 2 illustrates a functional block diagram of one embodiment of a parallel pseudo random number generator and a cryptographic key generator. The parallel pseudo random number generator 210 and the cryptographic key generator 220 may be implemented in a general-purpose computer system, such as the one shown in FIG. 4. The parallel pseudo random number generator 210 includes a number of BBS pseudo random number generators 212, 214, and 216. The outputs of the BBS pseudo random number generators 212, 214, and 216 are input to the cryptographic key generator 220, which extracts subsets of pseudo random bits from the outputs of the BBS pseudo random number generators 212, 214, and 216, and combines the subsets to generate a cryptographic key 229.

In some embodiments, the BBS pseudo random number generators 212, 214, and 216 starts with a collection of pairwise coprime n's. The BBS pseudo random number generators 212, 214, and 216 are executed substantially in parallel. The combined state of the BBS pseudo random number generators 212, 214, and 216 is as large as the product of all of these n's. Since the collection of n's is pairwise coprime, the cycle length is also the size of the product. The parallel pseudo random number generator 210 is faster than a single BBS pseudo random number generator using a large n because squaring a 2 k-bit number takes about three times as long as squaring a k-bit number, but squaring two k-bit numbers takes only about twice as long. For example, to obtain the same cycle length as for a 1024-bit n, 74 parallel generators with 16 bit n's may be used. As it would take 729 times as long to iterate a 1024-bit generator as it would to iterate a single 16-bit generator, this results in a speed-up factor of almost 10. Also, with 16-bit n's, the squaring modulo n operation may be reduced to a couple of table lookups and an addition, possibly followed by a subtraction.

In some embodiments, customized hardware (e.g., an application specific integrated circuit (ASIC), a field programmable logic array (FPLA), etc.) is built to implement the BBS pseudo random number generators 212, 214, and 216. Such customized hardware may operate at gigabit speed. Some embodiments of the customized hardware may include logic gates (e.g., XOR gates) and/or specific types of registers (e.g., linear shift registers).

In some embodiments, the cryptographic key generator 220 extracts a subset of the pseudo random bits from each of the BBS pseudo random number generators 212, 214, and 216. Extracting the pseudo random bits can be accomplished by extracting the low order p bits from each generator and combining the extracted bits by bitwise XOR, where p may be computed by floor(lg(floor(lg(min(n's))))). In other words, p is the number of bits that can be extracted from the generator with the smallest n.

In some embodiments, the cryptographic key generator 220 includes a more complex combiner. For example, the combiner may find a prime q that is larger than the largest n, construct a linear combination of the various X values, and take the residue modulo q. Then the combiner may use low order p bits from evaluating the linear combination. One way to come up with a linear combination would be to find a primitive polynomial over GF(q) (Galois Field of order q) with no zero coefficients, with the degree of the polynomial equal to k, the number of n values, and the coefficient of $x^k$ term, which may be one. Keeping the constant term, the combiner may assign each one to a different subgenerator. To generate a value, the combiner may cycle each subgenerator, multiply its X value by q−a[i], where a[i] is the coefficient assigned for the subgenerator. The combiner may add together the products and find the residue, modulo q. Then the combiner may output the low order p bits of the result as the cryptographic key 229.

Given a primitive polynomial over GF(q) of order k and a k-element set of x[0], . . . x[k−1], a recurrence relation for x[i] may be defined in terms of the polynomial's coefficients, and the previous k x values that has a cycle length of $q^{(k-1)}$. The relation may be very well distributed in up to k dimensions, which is a good property for the parallel pseudo random number generator 210 to have. Note that the cryptographic key generator 220 may be extended to use polynomials over GF(2) for the various n's, in which case the value q would be a primitive polynomial over GF(2) of the appropriate size.

To further illustrate the concept, one example is discussed in details below. However, one should appreciate that different set of numbers and polynomials may be used in other embodiments. In the following example, there are two n's, namely, 52,961 and 53,357. The q has a value of 54,269. A polynomial of $x^2-43077x-12346$ (mod 53,269) is used, which gives a combiner function of 43077*x[0]+12346*x[1] (mod 54,269). Two values are randomly selected, subject to the conditions of being larger than 323 and pairwise coprime with 52,961 and 53,357. In the current example, these two random values are 257 and 751. The parallel pseudo random number generator 210 squares each of these two values and takes their residue modulo as discussed above. These n values result in 13,088 and 30341, respectively, which are the seed values. For every three bits to be generated, each seed is squared, and the residue modulo of the appropriate n value is taken. Then the resulting bits are combined using a predetermined combining function (e.g., XOR, linear combination, etc.). Finally, the three low order bits are returned. The following table summarizes the values of X for each of the n's, the combiner value, and the three bits returned in each cycle of cycles 1 through cycle 4.

TABLE 1

Values of X for each of the n's, the combiner value, and the three bits returned in cycle 1 through cycle 4 in one example.

| Cycle | X for 52,961 | X for 53,357 | Combiner value | Bits |
|---|---|---|---|---|
| 1 | 19,870 | 7,960 | 2,323 | 011 |
| 2 | 45,606 | 26,841 | 44,334 | 110 |
| 3 | 22,844 | 4,089 | 28,925 | 101 |
| 4 | 23,603 | 19,180 | 29,340 | 100 |

Figure 3A:
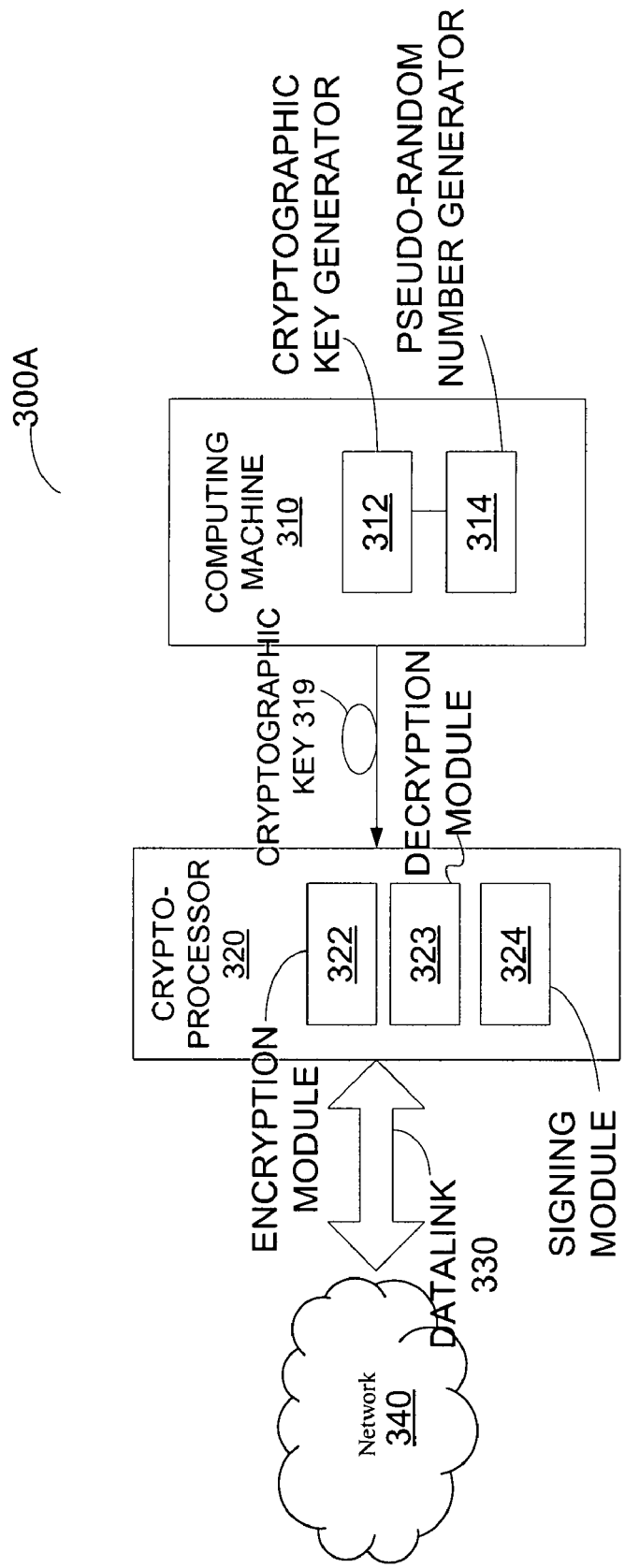
FIG. 3A illustrates one embodiment of a system in which embodiments of the present invention may be implemented.

FIG. 3A illustrates one embodiment of a system in which embodiments of the present invention may be implemented. The system 300A includes a computing machine 310, a crypto-processor 320, a datalink 330, and a network 340. The computing machine 310 is coupled to the crypto-processor 320, which is further coupled to the datalink 330. The datalink 330 is coupled to the network 340. Some examples of the computing machine 310 may include a server, a desktop personal computer (PC), a laptop PC, a personal digital assistant (PDA), a mobile telephone, etc. The crypto-processor 320 may be implemented on a special-purpose integrated circuit (IC) chip external to the computing machine 310, and hence, the crypto-processor 320 may also be referred to as a cryptographic-chip. Alternatively, the crypto-processor 320 may be implemented with a general-purpose processing device. The datalink 330 includes a communication medium or channel for transmitting data between the crypto-processor 320 and the network 340. The network 340 may include various types of networks, such as local area network (LAN), wide area network (WAN), wireless network, wirelined network, etc.

Note that any or all of the components and the associated hardware illustrated in FIG. 3A may be used in various embodiments. However, it should be appreciated that other configurations of the system 300A may include one or more additional devices not shown in FIG. 3A.

In some embodiments, the computing machine 310 includes a cryptographic key generator 312 and a parallel pseudo random number generator 314. Details of some embodiments of the parallel pseudo random number generator 314 have been described above. The parallel pseudo random number generator 314 generates a set of pseudo random bits, which are input to the cryptographic key generator 312. The cryptographic key generator 312 generates a cryptographic key 319 using the pseudo random bits. Details of some embodiments of the process to generate the cryptographic key 319 using the pseudo random bits have been described above. The computing machine 310 then sends the cryptographic key 319 to the crypto-processor 320.

In some embodiments, the crypto-processor 320 includes an encryption module 322, a decryption module 323, and a signing module 324. Using the cryptographic key 319 from the computing machine 310, the encryption module 322 may encrypt data (e.g., electronic documents, electronic mail, messages, etc.) from the computing machine 310 before sending the data onto the datalink 330. Likewise, the decryption module 323 may decrypt data from the datalink 330 before sending the data to the computing machine 310. In some embodiments, the signing module 324 uses the cryptographic key 319 to sign communication (e.g., electronic mail, electronic files, etc.) from the computing machine 310. Once signed, the communication may be sent to the network 340 via the datalink 330.

Figure 3B:
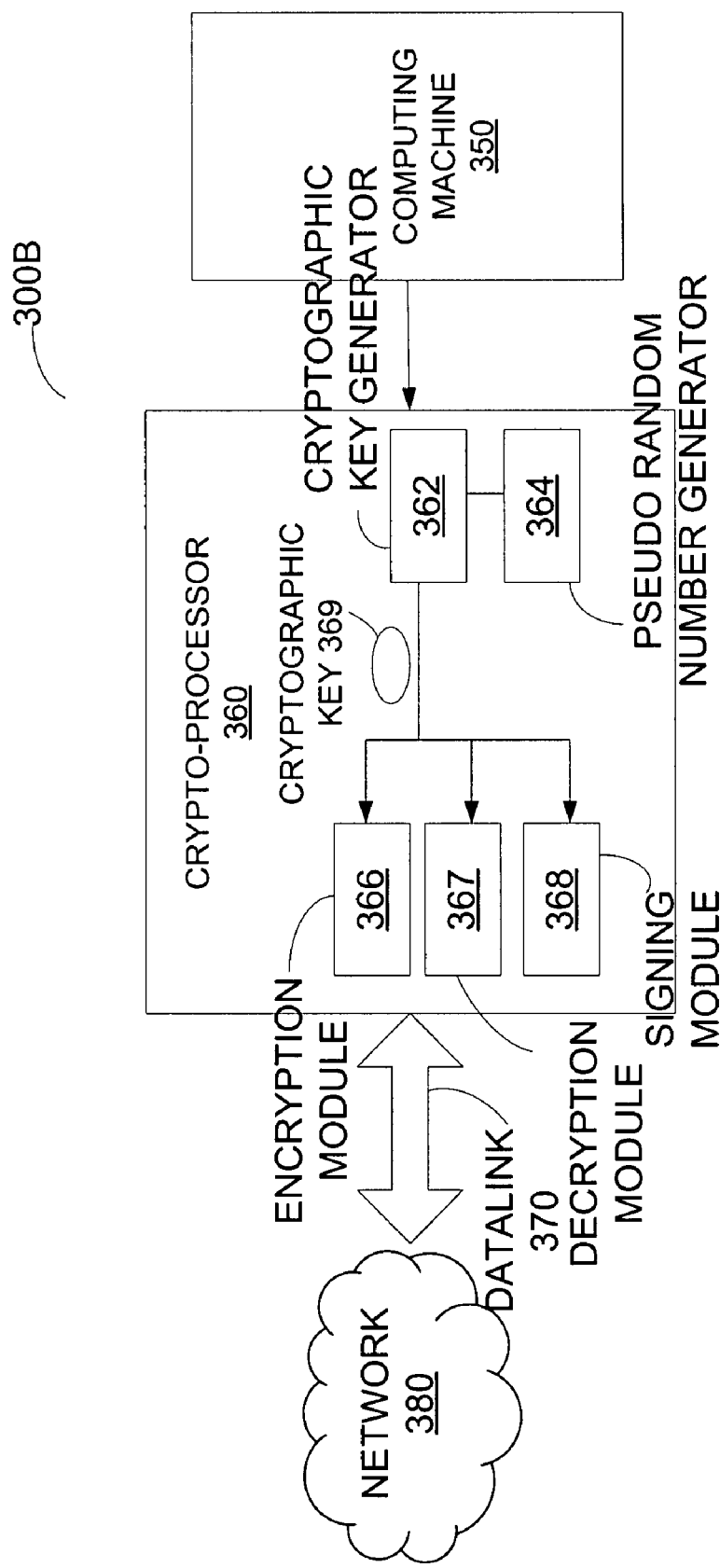
FIG. 3B illustrates an alternate embodiment of a system in which embodiments of the present invention may be implemented.

FIG. 3B illustrates an alternate embodiment of a system in which embodiments of the present invention may be implemented. The system 300B includes a computing machine 350, a crypto-processor 360, a datalink 370, and a network 380. The computing machine 350 is coupled to the crypto-processor 360, which is further coupled to the datalink 370. The datalink 370 is coupled to the network 380. Some examples of the computing machine 350 may include a server, a desktop PC, a laptop PC, a PDA, a mobile telephone, etc. The crypto-processor 360 may be implemented on an ASIC external to the computing machine 350, and hence, the crypto-processor 360 may also be referred to as a cryptographic-chip. The datalink 370 includes a communication medium or channel for transmitting data between the cryptoprocessor 360 and the network 380. The network 380 may include various types of networks, such as LAN, WAN, wireless network, wirelined network, etc.

Note that any or all of the components and the associated hardware illustrated in FIG. 3B may be used in various embodiments. However, it should be appreciated that other configurations of the system 300B may include one or more additional devices not shown in FIG. 3B.

In some embodiments, the crypto-processor 360 includes a cryptographic key generator 362, a pseudo random number generator 364, an encryption module 366, a decryption module 367, and a signing module 368. The pseudo random number generator 364 may be implemented by hardware, software, or a combination of both. For example, the pseudo random number generator 364 may be implemented using a Java script embedded within a web page. Alternatively, customized hardware (e.g., a FPLA, an ASIC, etc.) may be used to implement the pseudo random number generator 364. Details of some embodiments of the pseudo random number generator 364 have been described above. The pseudo random number generator 364 generates a set of pseudo random bits, which are input to the cryptographic key generator 362. The cryptographic key generator 362 generates a cryptographic key 369 using the pseudo random bits. Details of some embodiments of the process to generate the cryptographic key 369 using the pseudo random bits have been described above. The cryptographic key generator 362 then sends the cryptographic key 369 to the encryption module 366, the decryption module 367, and/or the signing module 368.

Using the cryptographic key 369, the encryption module 366 may encrypt data (e.g., electronic documents, electronic mail, messages, etc.) from the computing machine 350 before sending the data onto the datalink 370. Likewise, the decryption module 367 may decrypt data from the datalink 370 before sending the data to the computing machine 350. In some embodiments, the signing module 368 uses the cryptographic key 369 to sign communication (e.g., electronic mail, electronic files, etc.) from the computing machine 350. Once signed, the communication may be sent to the network 380 via the datalink 370.

Figure 4:
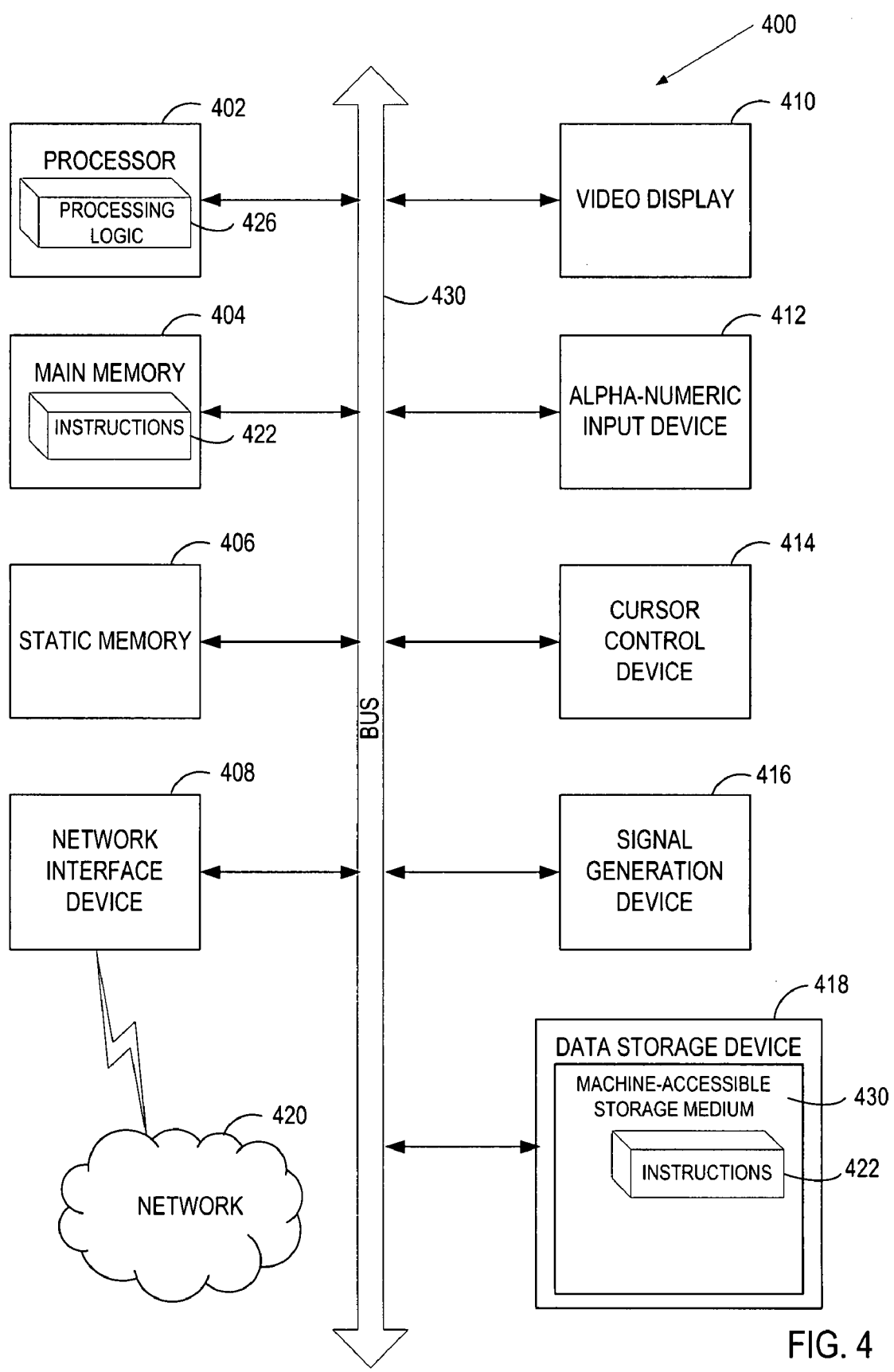
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an ASIC, a PFGA, a DSP, network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to generate pseudo random bits for a cryptographic key have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
executing, by a processing device, a plurality of Blum-Blum-Shub (BBS) pseudo random number generators in parallel, wherein each of the plurality of BBS pseudo random number generators perform a plurality of algorithm iterations, wherein an algorithm iteration generates an output, and wherein one or more pseudo-random bits are determined from the output, the one or more pseudo-random bits comprising a parity bit of the output or one or more least significant bits of the output;

arranging, by the processing device, for at least two BBS pseudo random number generators of the plurality of BBS pseudo random number generators, the one or more pseudo-random bits from the plurality of algorithm iterations into a series of pseudo random bits;

extracting, by the processing device, for each of the at least two BBS pseudo random number generators, a subset of pseudo random bits from the series of pseudo random bits, wherein each subset has fewer bits than the series of pseudo random bits; and combining, by the processing device, the extracted subsets of pseudo random bits from the at least two BBS pseudo random number generators to generate a cryptographic key.

2. The method of claim 1, wherein the subset of pseudo random bits from the series of pseudo random bits includes a predetermined number of low order bits in the series of pseudo random bits.

3. The method of claim 1, wherein combining the subsets of pseudo random bits from the series of pseudo random bits comprises:
performing, by the processing device, a bitwise exclusive-or (XOR) operation on the subsets of the series of pseudo random bits.

4. The method of claim 1, wherein combining the subsets of pseudo random bits from the series of pseudo random bits comprises:
applying, by the processing device, a linear combining function on the subsets of pseudo random bits from the series of pseudo random bits.

5. The method of claim 1, further comprising:
using, by the processing device, the cryptographic key to encrypt a first electronic document before sending the first electronic document to a network; and
using, by the processing device, the cryptographic key to decrypt a second electronic document from the network before forwarding the second electronic document to a computing machine.

6. The method of claim 1, further comprising:
using, by the processing device, the cryptographic key to sign electronic communication.

7. An apparatus comprising:
a storage device to store instructions; and
a processing device, coupled to the storage device, configured to execute the instructions to:
operate a plurality of Blum-Blum-Shub (BBS) pseudo random number generators in parallel to cause each of the plurality of BBS pseudo random number generators to perform a plurality of algorithm iterations, wherein an algorithm iteration generates an output, and wherein one or more pseudo-random bits are determined from the output, the one or more pseudo-random bits comprising a parity bit of the output or one or more least significant bits of the output, and
operate a cryptographic key generator to:
arrange, for at least two BBS pseudo random number generators of the plurality of BBS pseudo random number generators, the one or more pseudo-random bits from the plurality of algorithm iterations into a series of pseudo random bits;
extract, for each of the at least two BBS pseudo random number generators, a subset of the series of pseudo random bits, wherein each subset has fewer bits than the series of pseudo random bits; and
combine the extracted subsets of pseudo random bits from the at least two BBS pseudo random number generators to generate a cryptographic key.

8. The apparatus of claim 7, wherein the subset of the series of pseudo random bits includes a predetermined number of low order bits in the series of pseudo random bits.

9. The apparatus of claim 7, wherein the cryptographic key generator comprises:
a plurality of exclusive-or (XOR) gates to perform an XOR operation on the subsets of the series of pseudo random bits.

10. The apparatus of claim 7, wherein the cryptographic key generator applies a linear combining function on the subsets of the series of pseudo random bits.

11. The apparatus of claim 7, wherein the processing device further operates an encryption module to encrypt data using the cryptographic key, and a decryption module to decrypt data using the cryptographic key.

12. The apparatus of claim 7, wherein the processing device further operates a signing module to sign electronic communication using the cryptographic key.

13. A system comprising the apparatus of claim 7, further comprising:
a datalink; and
a cryptographic-chip coupled between the datalink and the apparatus, wherein the cryptographic-chip comprises an encryption module to use the cryptographic key from the apparatus to encrypt data from the apparatus before sending the data onto the datalink.

14. A system comprising the apparatus of claim 7, further comprising:
a datalink; and
a cryptographic-chip coupled between the datalink and the apparatus, wherein the cryptographic-chip comprises a decryption module to use the cryptographic key from the apparatus to decrypt data from the datalink before sending the data to the apparatus.

15. A non-transitory machine-readable medium that provides instructions that, when executed by a processor, will cause the processor to perform operations comprising:
executing, by the processor, a plurality of Blum-Blum-Shub (BBS) pseudo random number generators in parallel, wherein each of the plurality of BBS pseudo random number generators perform a plurality of algorithm iterations, wherein an algorithm iteration generates an output, and wherein one or more pseudo-random bits are determined from the output, the one or more pseudo-random bits comprising a parity bit of the output or one or more least significant bits of the output;
arranging, by the processor, for at least two BBS pseudo random number generators of the plurality of BBS pseudo random number generators, the one or more pseudo-random bits from the plurality of algorithm iterations into a series of pseudo random bits;
extracting, for each of the at least two BBS pseudo random number generators, a subset of pseudo random bits from the series of pseudo random bits, wherein each subset has fewer bits than the series of pseudo random bits; and
combining the extracted subsets of pseudo random bits from the at least two BBS pseudo random number generators to generate a cryptographic key.

16. The non-transitory machine-readable medium of claim 15, wherein the subset of pseudo random bits from the series of pseudo random bits includes a predetermined number of low order bits in the series of pseudo random bits.

17. The non-transitory machine-readable medium of claim 15, wherein combining the subsets of pseudo random bits from the series of pseudo random bits comprises:

performing a bitwise exclusive-or (XOR) operation on the subsets of the series of pseudo random bits.

18. The non-transitory machine-readable medium of claim 15, wherein combining the subsets of pseudo random bits from the series of pseudo random bits comprises:

applying a linear combining function on the subsets of pseudo random bits from the series of random bits.

19. The non-transitory machine-readable medium of claim 15, wherein the operations further comprise:

using the cryptographic key to encrypt a first electronic document before sending the first electronic document to a network; and using the cryptographic key to decrypt a second electronic document from the network before forwarding the second electronic document to a computing machine.

20. The non-transitory machine-readable medium of claim 15, wherein the operations further comprise:

using the cryptographic key to sign electronic communication.

* * * * *